United States Patent
Fukuda et al.

(10) Patent No.: US 10,832,129 B2
(45) Date of Patent: Nov. 10, 2020

(54) TRANSFER OF AN ACOUSTIC KNOWLEDGE TO A NEURAL NETWORK

(71) Applicant: INTERNATIONAL BUSINESS MACHINES CORPORATION, Armonk, NY (US)

(72) Inventors: Takashi Fukuda, Tokyo (JP); Masayuki A. Suzuki, Tokyo (JP); Ryuki Tachibana, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 15/288,515

(22) Filed: Oct. 7, 2016

(65) Prior Publication Data

US 2018/0101764 A1    Apr. 12, 2018

(51) Int. Cl.
*G06N 3/08*     (2006.01)
*G10L 15/06*    (2013.01)
(Continued)

(52) U.S. Cl.
CPC .............. *G06N 3/08* (2013.01); *G10L 15/063* (2013.01); *G10L 15/16* (2013.01); *G06N 7/005* (2013.01)

(58) Field of Classification Search
CPC ....... G10L 15/02; G10L 15/063; G10L 15/08; G10L 15/16; G10L 15/183; G10L 15/187;
(Continued)

(56) References Cited

U.S. PATENT DOCUMENTS

| 9,240,184 B1 | 1/2016 | Lin et al. |
| 9,311,915 B2 | 4/2016 | Weinstein et al. |

(Continued)

FOREIGN PATENT DOCUMENTS

| EP | 2736042 A1 | 5/2014 |
| JP | 2015212731 A | 11/2015 |

OTHER PUBLICATIONS

Sun et al., Using Sparse Classification Outputs as Feature Observations for Noise-Robust ASR, INTERSPEECH, Jan. 2012. (Year: 2012).*

(Continued)

*Primary Examiner* — Vincent Gonzales
*Assistant Examiner* — Marshall L Werner
(74) *Attorney, Agent, or Firm* — Tutunjian & Bitetto, P.C.; Randall Bluestone

(57) ABSTRACT

A method for transferring acoustic knowledge of a trained acoustic model (AM) to a neural network (NN) includes reading, into memory, the NN and the AM, the AM being trained with target domain data, and a set of training data including a set of phoneme data, the set of training data being data obtained from a domain different from a target domain for the target domain data, inputting training data from the set of training data into the AM, calculating one or more posterior probabilities of context-dependent states corresponding to phonemes in a phoneme class of a phoneme to which each frame in the training data belongs, and generating a posterior probability vector from the one or more posterior probabilities, as a soft label for the NN, and inputting the training data into the NN and updating the NN, using the soft label.

13 Claims, 6 Drawing Sheets

(51) Int. Cl.
*G10L 15/16* (2006.01)
*G06N 7/00* (2006.01)

(58) Field of Classification Search
CPC ... G10L 15/30; G10L 15/63; G10L 2015/025; G10L 25/30; G06N 20/00; G06N 3/02; G06N 3/0445; G06N 3/0454; G06N 3/049; G06N 3/08; G06N 7/005; H04M 2201/40; G06F 17/2785
See application file for complete search history.

(56) References Cited

U.S. PATENT DOCUMENTS

| | | | | |
|---|---|---|---|---|
| 9,786,270 | B2* | 10/2017 | Senior | G10L 15/063 |
| 2010/0217589 | A1* | 8/2010 | Gruhn | G10L 15/063 |
| | | | | 704/232 |
| 2012/0065976 | A1* | 3/2012 | Deng | G10L 15/14 |
| | | | | 704/256.1 |
| 2014/0149112 | A1* | 5/2014 | Kalinli-Akbacak | G10L 25/03 |
| | | | | 704/232 |
| 2015/0340032 | A1* | 11/2015 | Gruenstein | G06N 3/08 |
| | | | | 704/232 |
| 2016/0086599 | A1 | 3/2016 | Karuta et al. | |
| 2017/0011738 | A1* | 1/2017 | Senior | G10L 15/063 |
| 2017/0076200 | A1* | 3/2017 | Nasu | G06N 3/0472 |

OTHER PUBLICATIONS

Swietojanski, P., et al. Revisiting Hybrid and GMM-HMM System Combination Techniques. Acoustics, Speech and Signal Processing (ICASSP), 2013 IEEE International Conference. May 2013. (5 pages).

Hinton, G., et al. Deep Neural Networks for Acoustic Modeling in Speech Recognition. IEEE Signal Processing Magazine, vol. 29, Issue: 6. Nov. 2012. pp. 1-27.

* cited by examiner

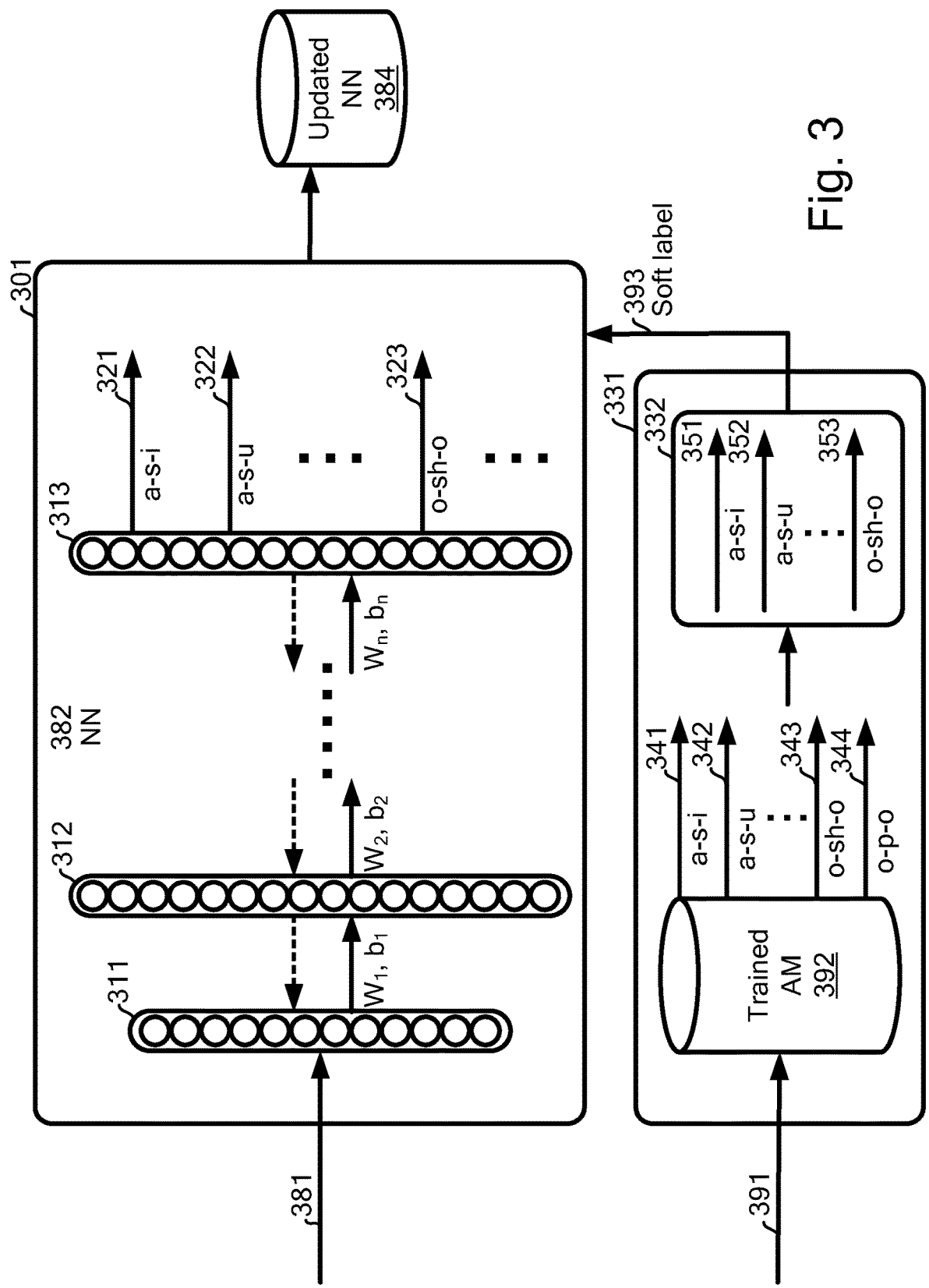

|  | Acoustic model name | Training data set | Data size (hours) |
|---|---|---|---|
| Base | Target-domain GMM | Lecture data | 83 |
| Comparative 1 | Source-domain CNN | Farfield data | 55 |
| Comparative 2 | Adapted CNN | Subset of farfield data | 0.71 (2560 sec.) |
| Example | Adapted CNN | Subset of farfield data | 0.71 (2560 sec.) |

501

|  | Acoustic model name | Posteriors for target layers | CER % |
|---|---|---|---|
| Comparative 1 | Source-domain CNN | N/A | 37.2 |
| Comparative 2 | Adapted CNN | All of the context-dependent states | 36.9 |
| Example | Adapted CNN | Context-dependent states corresponding to each phoneme in a phoneme class to which each frame in the training data belongs | 34.6 |

TRANSFER OF AN ACOUSTIC KNOWLEDGE TO A NEURAL NETWORK

BACKGROUND

Technical Field

The present invention generally relates to a speech recognition system and, more especially to training a neural network by transferring acoustic knowledge of a trained acoustic model (AM) to a neural network (NN).

Description of the Related Art

In recent years, framework of speech recognition systems have drastically changed from a hybrid usage of Gaussian Mixture Model (hereinafter referred to as "GMM") and Hidden Markov Model (hereinafter referred to as "HMM") to that of Convolutional Neural Network (hereinafter also referred to as "CNN") and HMM or that of Deep Neural Network (hereinafter also referred to as "DNN") and HMM.

SUMMARY

According to one aspect of the present invention, an embodiment of the present invention provides a computer-implemented method for transferring acoustic knowledge of a trained AM to an NN. The method includes reading, into a memory, the NN, the AM, the AM being trained with target domain data, and a set of training data consisting of a set of phoneme data, the training data being data obtained from a domain different from a target domain for the target domain data; inputting training data into the AM, calculating each posterior probability of context-dependent states corresponding to each phoneme in a phoneme class of a phoneme which each frame in the training data belongs, and generating a posterior probability vector from the calculated posterior probabilities, as a soft label for the NN; and inputting the training data into the NN and updating the NN, using the soft label.

According to another aspect of the present invention, a speech recognition system which performs speech recognition, using the updated NN which was trained according to the one or more methods described herein, is provided.

According to another aspect of the present invention, a system, such as a computer system, comprising a processor and a memory storing a program of instructions executable by the processor to perform one or more methods described herein is provided.

According to another aspect of the present invention, a computer program product comprising a computer readable storage medium storing a program of instructions executable by a system to perform one or more methods described herein is provided.

BRIEF DESCRIPTION OF THE DRAWINGS

The following description will provide details of preferred embodiments with reference to the following figures wherein:

FIG. 3 illustrates a diagram of the method described in FIG. 2;

FIG. 5 illustrates results of comparative examples and a working example according to an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term "a target domain" refers to an acoustic domain in which an acoustic model (AM) will be used.

The term "an acoustic model" (AM) refers to a model which contains statical representations of each of the distinct sounds which makes up a word. Each of the statical representations is assigned to a label called a phoneme. For, example, the English language has approximately forty distinct sounds which are useful for speech recognition and, therefore, there are forty different phonemes.

The term "a neural network" refers to an interconnected group of nodes comprising an input layer, an output layer and one or more hidden layers between the input layer and the output layer. The neural network takes several frames of coefficients in an acoustic feature as input and produces posterior probabilities over context-dependent states as output.

Figure 1:
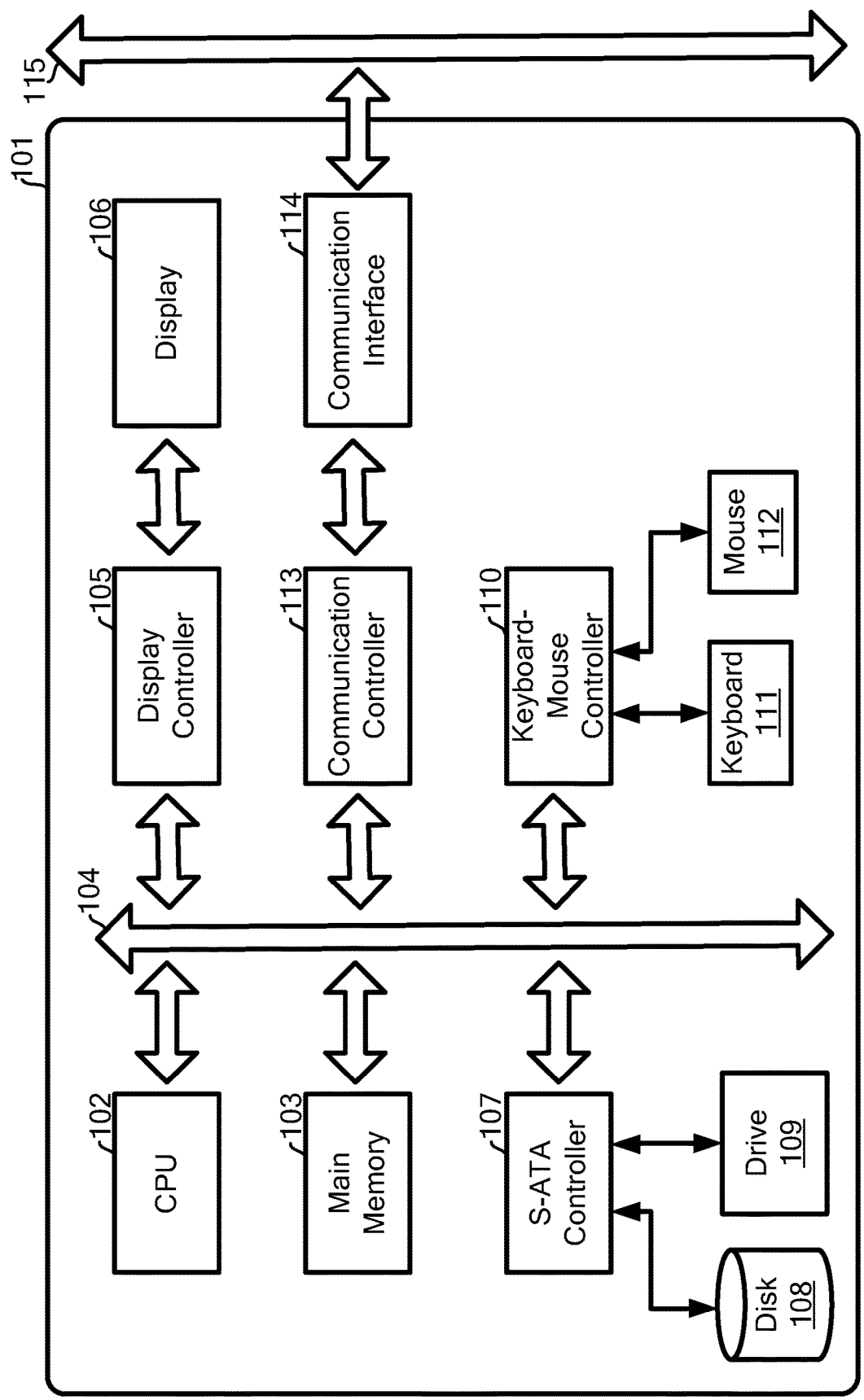
FIG. 1 illustrates an exemplified basic block diagram of computer hardware used in an embodiment of the present invention.

With reference now to FIG. 1, FIG. 1 illustrates an exemplified basic block diagram of computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may include one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a BD (Blu-ray disk) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2, 3, 4A and 4B, and 5 described below.

Prior to explanation of an embodiment of the present invention, the idea of an embodiment of the present invention will be first explained.

In recent years, an NN-based AM has become the dominant AM for speech recognition systems instead of a conventional AM, such as a GMM-based AM. This is because the NN-based AM shows better performance compared to the GMM-based AM. However, better performance for the NN-based AM may be obtained under the following preconditions in that a sufficient amount of target domain data can be used as a training data. This is because performance of a speech recognition system highly depends on how much training data can be used for constructing an AM and whether or not the training data is matched to the target domain. Accordingly, in the case where the performance of the GMM-based AM trained with target domain data is compared to that of the NN-based AM trained with non-target domain, the GMM-based AM shows better performance, compared to the NN-based AM. In other words, when there is not enough training data for the NN-based AM, the trained NN-based AM works poorly for the target domain due to unmatched training data.

Currently, there is a situation in which the target domain data is currently not available any more, but one or more referenced AMs exist, such as GMM-based AMs, each of which was previously trained (e.g., in the past) with target domain data (that is, data acoustically matched to the target domain).

Accordingly, in order to solve the situation in which the target domain data is not available anymore, the present invention transfers acoustic property, such as acoustic knowledge and behavior, of the GMM-based AM trained with target domain data to the NN-based AM.

The purpose of the present invention is to provide a method for adapting the NN-based AM to a target domain by not relying on the target domain data.

The trained AM, such as GMM-based AMs trained with target domain data, can be used for transferring the acoustic property to the NN-based AM without using the target domain data.

Figure 2:
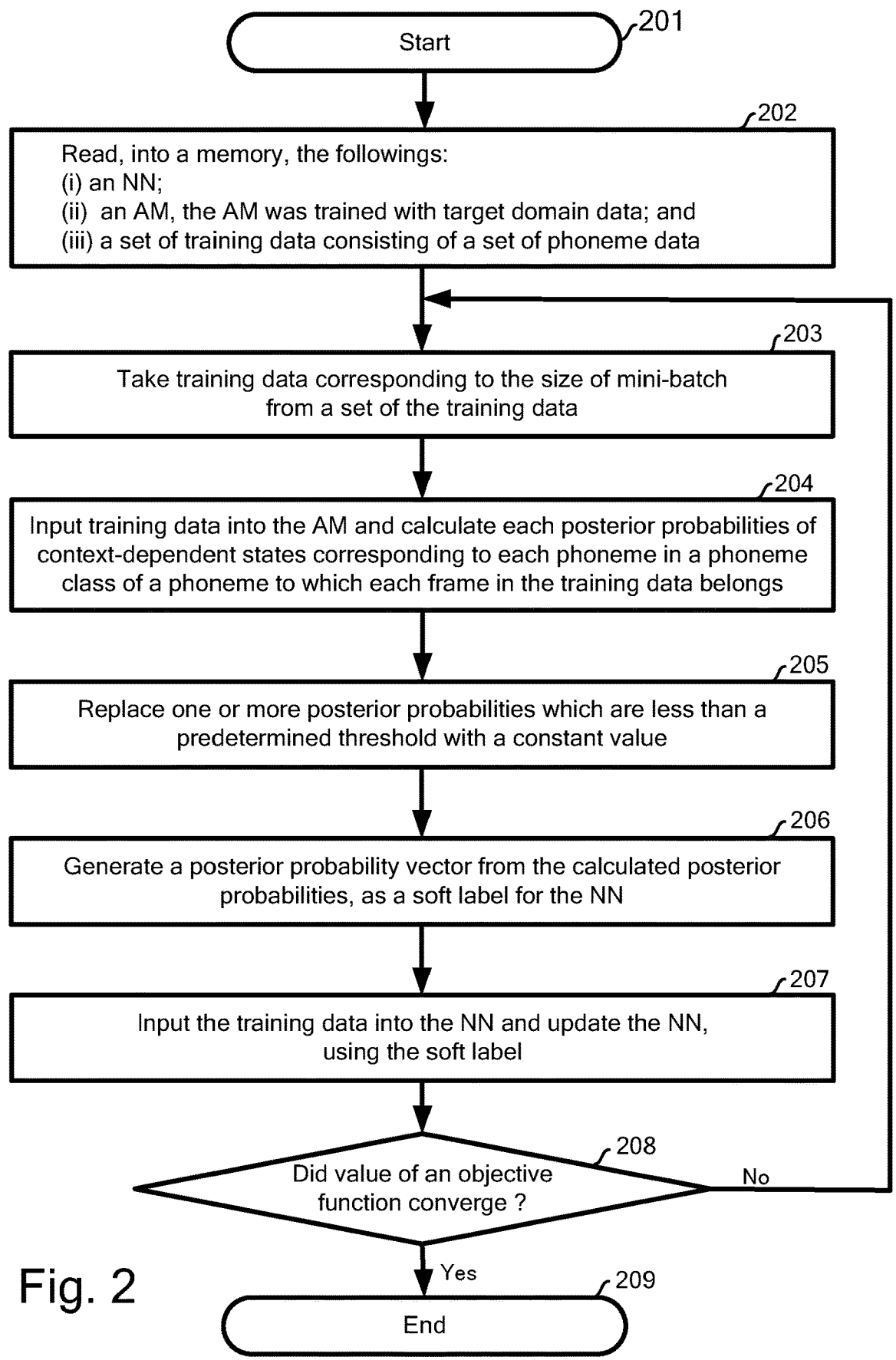
FIG. 2 illustrates a flowchart of a method for transferring acoustic knowledge of a trained AM to an NN.

With reference now to FIG. 2, FIG. 2 illustrates a method for transferring acoustic knowledge of a trained AM to an NN, according to an embodiment of the present invention.

A system, such as the computer (101) described in FIG. 1, performs the method described in FIG. 2. This method is carried out in a training stage of the NN.

Let us suppose the followings items (1) to (4) which will be used in an embodiment of the present invention.

(1) An NN is referred to as "a neural network". The NN is a receiver of acoustic knowledge of a trained AM described in item (2) below.

The NN may be an NN initialized with random values (that is, an NN which is untrained until now) or a NN which was trained with data which is different from target domain data used for training the AM, such as source domain data. The NN may be, for example, but not limited to, a Deep NN (DNN), a Convolutional NN (CNN), or a Recurrent NN (RNN).

The NN can be stored in storage accessible by the system, such as the disk (108) described in FIG. 1 or a network attached storage.

(2) An AM is a model which was previously trained with the target domain data. The AM, which was trained with target domain data, may also be referred to herein as "a trained AM".

The AM is referred to as "a trained acoustic model". The AM is a source of transferring acoustic knowledge of the trained AM to the NN described in item (1) above.

The AM, which can be used in an embodiment of the present invention, may be, for example, but not limited to, a GMM-based AM or a NN-based AM which was trained with target domain data. This is because-the trained AM, such as GMM-based AMs trained with target domain data, can be used for transferring the acoustic property to the NN mentioned in item (1) above without using the target domain data. In a case in which the NN-based AM is used as a source of transferring acoustic knowledge for an embodiment of the present invention, a type or topology of the NN-based AM is different from that of the NN mentioned in item (1) above.

The GMM-based AM may be, for example, but not limited to, a GMM-HMM AM.

The NN-based AM may be, for example, but not limited to, a Convolutional NN (CNN) based AM, or a Recurrent NN based AM.

The AM can be stored in storage accessible by the system, such as the disk (108) described in FIG. 1 or a network attached storage.

(3) A set of training data includes a set of phoneme data. The training data is obtained from a domain different from a target domain for the target domain data. The set of training data may be, for example, but not limited to, a source domain data.

A set of training data may be stored in storage accessible by the system, such as the disk (108) described in FIG. 1 or a network attached storage.

(4) A set of phoneme classes may be a class defined by a plurality of features, for example, but not limited to, a position of a tongue of a speaker when she or he produces a sound (or a generates a phoneme), friction or rupture.

Each phoneme class comprises several phonemes and an attribute of each class is defined based at least in part on acoustic characteristics of phonemes. Each of the phonemes in the several phonemes has a similar acoustic characteristic of phonemes with each other.

The set of phoneme class can be prepared using any features known in the art. For example, the following techniques can be used as an index for preparing the set of phoneme class: distinctive features techniques, confusion matrix-based feature techniques, or Bhattacharyya distance-based techniques using a distance between models in a phoneme model.

For the distinctive features, the following perception is used: The distinctive features are the most basic unit of a phonological structure which may be analyzed in a phonological theory, and the phonemes in each phoneme class have the same type of distinctive features.

Further, when the distinctive features are used as an index for preparing the set of phoneme classes, all phonemes are uniquely specified by a combination of distinctive features.

A person skilled in the art can produce a phoneme class, using the features mentioned above. An example of the phoneme class may be, for example, but not limited to, the following: {s, sh}, {p, t, k}, {b, d, g}. These examples of the phoneme classes are generated by grouping phonemes which have closer distinctive features.

The set of phoneme classes may be stored in storage accessible by the system, such as the disk (108) described in FIG. 1 or a network attached storage.

In step 201, the system starts the method described above.

In step 202, the system reads, into memory, such as the memory (103) described in FIG. 1, the NN, the trained AM, and the set of the training data. Each of the definitions of the NN, the AM and the set of the training data is defined above.

In step 203, the system takes training data corresponding to the size of a mini-batch from the set of the training data. The size of the mini-batch may be determined in advance, for example, by a user. The size of the mini-batch may be, for example, but not limited to, 256 frames. The training data may be randomly taken from the set of the training data by the system.

Each mini-batch has a plurality of frames. Each frame corresponds to one phoneme data.

In step 204, the system inputs the obtained training data into the trained AM.

In response to the input of the obtained training data, the system calculates each posterior probability of context-dependent states corresponding to each phoneme in a phoneme class of a phoneme to which each frame in the training data belongs.

When target domain data is not available, the unmatched training data or training data which does not completely match with the target domain is inputted to the AM trained with target domain data. In such situations, the posterior probability of a phoneme which is acoustically far from the phoneme input to the AM cannot be reliable. Meanwhile, the acoustic behavior of phonemes which is acoustically similar can be reliable. Accordingly, it is required to limit a soft label to a posterior probability which is only for phoneme group corresponding to the input phoneme.

Further, the similar acoustic knowledge relating to phonemes in the phoneme class can be obtained using the phoneme class and therefore the posterior probability obtained from the trained AM can be useful for generating a posterior probability vector as a soft label for the NN, described below in step 206.

As a result of step 204, the posterior probabilities are obtained.

In step 204, when a part corresponding to a phoneme which does not belong to a class for the input phoneme, zero or a smaller value may be input to the part.

One embodiment of step 204 will be described below, as shown in FIG. 3.

In an optional step 205, the system replaces one or more posterior probabilities which are less than a predetermined threshold with a constant value. The predetermined threshold may be determined in advance, for example, by a user. The constant value may be a smaller value compared to an original posterior probability.

In step 205, one or more posterior probabilities having a higher probability can be emphasized by the replacement described above.

One embodiment of step 205 will be described below, as shown in FIG. 3.

In step 206, the system generates a posterior probability vector from the calculated posterior probabilities from step 204 or a posterior probability vector comprising the replaced one or more posterior probabilities obtained from step 205, as a soft label for the NN.

The posterior probability vector obtained in step 206 reflects acoustic behavior in the target domain. This is because the trained AM was trained for the target domain.

The soft label can be referred also to as "targets of the NN" in the art of speech recognition.

In step 207, the system inputs the obtained training data, which was also input to the trained AM in step 204, into the NN and then updates the NN, using the soft label obtained in step 206. The update of the NN is done by updating $W_{i,j}$ and $b_i$ between the layers so that each posterior probability obtained from the NN can be made closer to the corresponding posterior probability in the soft label. $W_{i,j}$ denotes a weight matrix between j-th units in the previous layer and i-th unit in the current layer. $b_i$ denotes a bias for the i-th unit in the current layer. Context-dependent states for the output layer are based on a phoneme decision tree which is the same tree as that used for the trained AM.

One embodiment of step 207 will be described below, as shown in FIG. 3.

In step 208, the system determines whether a value of an objective function converges or not. The objective function may be optimized using a back propagation with a stochastic gradient descent method in mini-batch mode of N sample frames. An example of the back propagation is shown in FIG. 3 described below as down-pointing arrows between the layers.

If the determination is positive, the system proceeds to step 209. Meanwhile, if the determination is negative, the system proceeds back to step 203 and then steps 203 to 208 are repeated until the determination is positive in step 208.

The updating of the NN can be performed by repeating steps 204 to 208.

In step 209, the system terminates the method described above.

According to the method described above, the updated NN to which acoustic knowledge of the trained AM was transferred can be obtained. Accordingly, the updated NN can imitate the acoustic characteristics of the trained AM With reference now to FIG. 3, FIG. 3 illustrates an embodiment of the method described in FIG. 2.

FIG. 3 illustrates a trained AM (392) and an NN (382). The trained AM (392) was trained with target domain data.

The items (1) to (4) described above may be applied here.

The system (331) performs the computer program for the trained AM (392). The system (331) takes, from a set of training data, training data corresponding to the size of a mini-batch and then inputs the training data (391) into the trained AM (392). Let us suppose that a frame in the training data (391) comprises phoneme data, {s}.

The system (331) retrieves a phoneme class to which each frame in the training data belongs from the set of phoneme classes. Let us suppose that the retrieved phoneme class is {s, sh}.

The system (331) calculates each posterior probability of context-dependent states corresponding to phoneme {s}, {sh} in the phoneme class {s, sh}.

The output of the trained AM (392) can be expressed as follows: For example, {a-s-i} represents a phoneme model symbol and denotes a target phoneme, {S}, a phoneme before the target phoneme, {a}, and a phoneme after the target, {i}. The phoneme model symbol, {a-s-i}, has three phonemes. Accordingly, the phoneme model symbol having three phonemes is called as "triphone". When a phoneme model symbol has a target phoneme, two phonemes before the target phoneme and two phonemes after the target phoneme, the phoneme model symbol is called a "quinphone". The quinphone is often used in the DNN-based AM.

When the outputs from the trained AM (392) are {a-s-i} (341), {a-s-u} (342), . . . , {o-sh-o} (343), and {o-p-o} (344), the system (331) calculates each posterior probability of {a-s-i} (341), {a-s-u} (342), and {o-sh-o} (343) in which phoneme {s} is included. Accordingly, the system does not calculate posterior probability of {o-p-o} (344).

Let us suppose that the calculated posterior probabilities are the following: {a-s-i} (341) "−15.0", {a-s-u} (342) "−18.3", . . . , and {o-sh-o} (343) "−35.7". The calculated posterior probabilities can be used to generate a posterior probability vector as a soft label (393).

In an optional step (332), the calculated posterior probabilities may be further processed as described below.

The system (331) may replace one or more posterior probabilities which are less than a predetermined threshold with a constant value. Let us suppose that the predetermined threshold is 0.2. The posterior probability, {o-sh-o} (343) "−35.7" is less than the predetermined threshold. Accordingly, the system (331) replaces "−35.7" with a constant value. The constant value may be less than "−35.7". For example, the constant value may be "−50.0".

In response to the replacement, the calculated posterior probabilities comprising the replaced one or more posterior probabilities can be used to generate a posterior probability vector as a soft label (393) instead of the posterior probability vector mentioned above.

The system (301) performs the computer program for the NN (382). The system (301) may be the same as or different from the system (331).

The system (301) inputs, into the NN (382), the training data (381) which is the same data input to the trained AM (392). Accordingly, the frame in the training data (381) comprises the phoneme data, {s}.

The system (301) updates the NN (382) by adjusting $W_{i,j}$ and $b_1$ between the layers, such as between an input layer (311) and a hidden layer (312), . . . , and a hidden layer (not shown) and an output layer (313), so that each posterior probability (321, 322 and 323) obtained from the NN (382) can be made closer to the corresponding posterior probability (341, 342 and 343; or 351, 352 and 353) in the soft label (393).

In the NN (382), each of the up-pointing arrows between the layers, such as input layer (311) and the hidden layer (312); . . . ; and the hidden layer (not shown) and the output layer (313), shows a forward propagation, and each of the down-pointing arrows between the layers mentioned above shows a back propagation. The training in the NN (382) can be carried out using the back propagations between layers.

The same method described above is repeatedly performed for each of training data among a set of the training data.

As a result, the updated NN (384) to which acoustic knowledge of the trained AM (392) was transferred can be obtained.

Figure 4A:
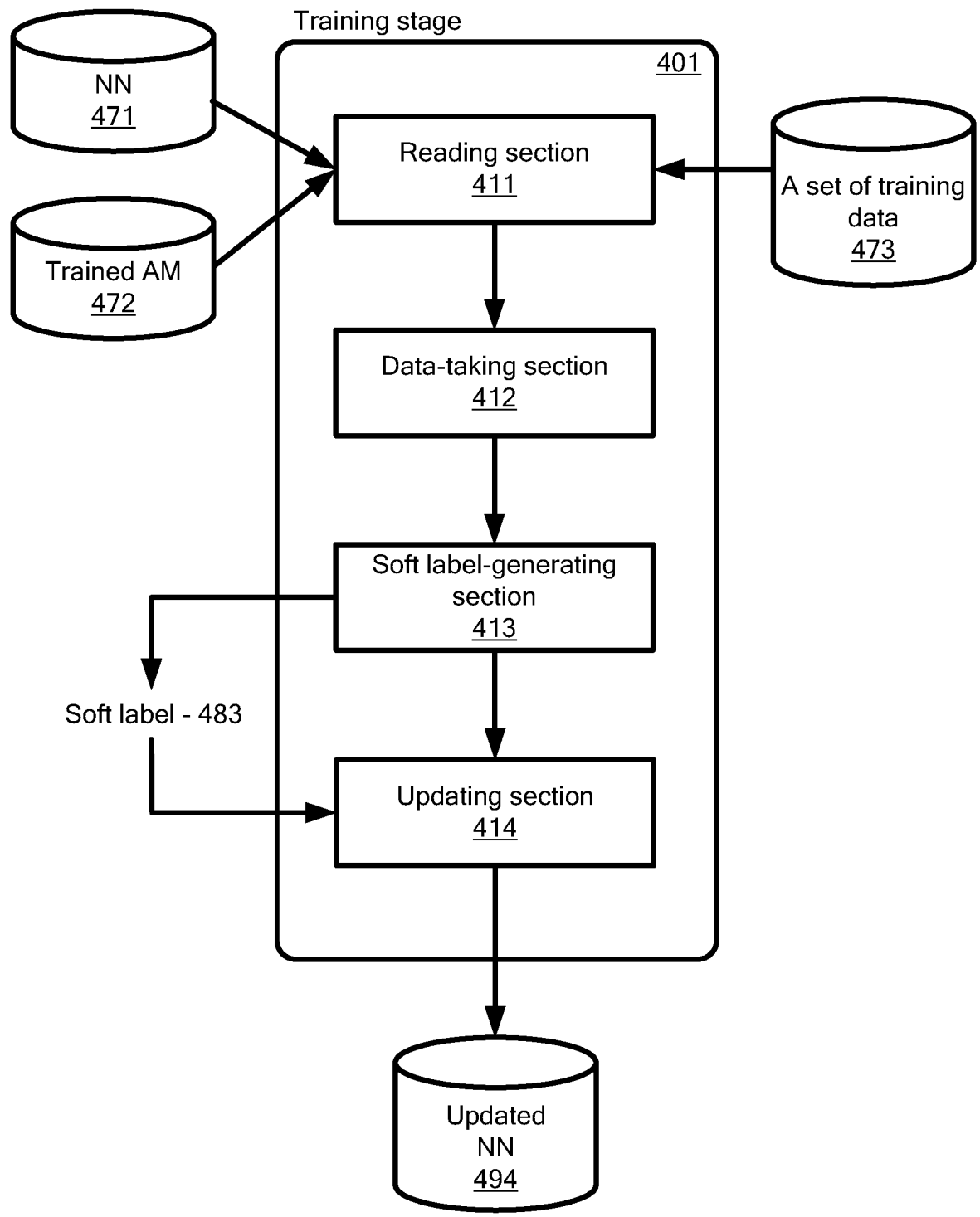
FIG. 4A illustrates a system used for performing a training stage according to the method described in FIG. 2.
Figure 4B:
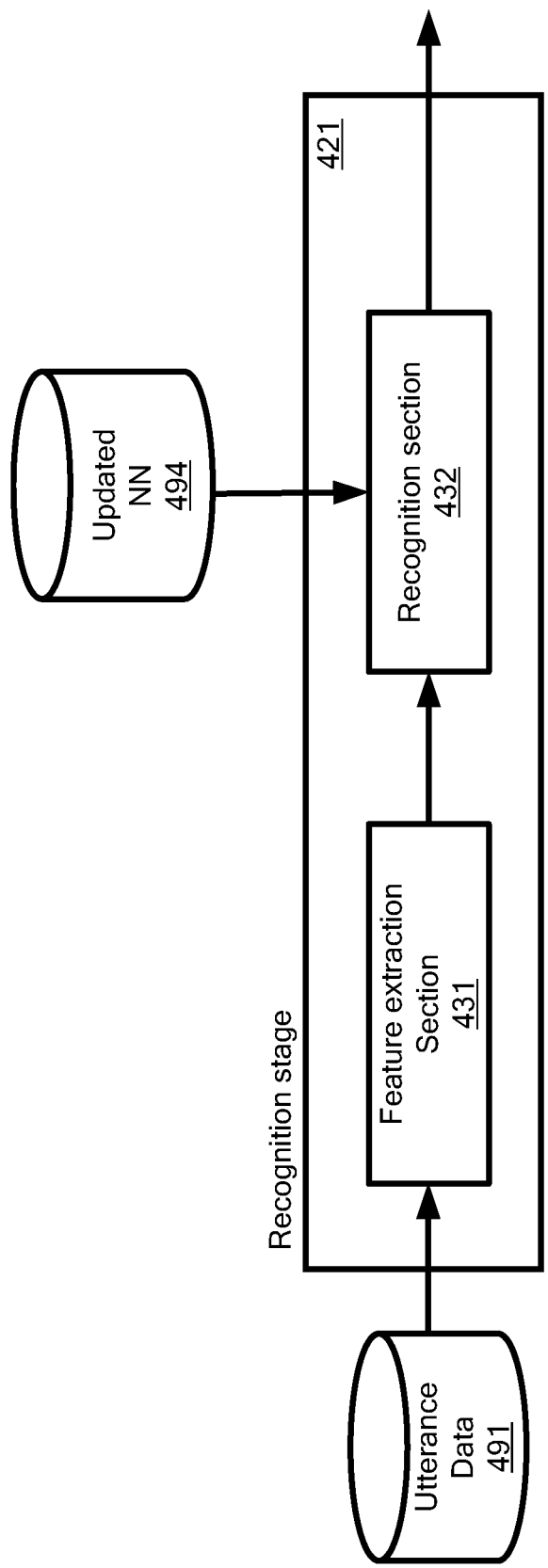
FIG. 4B illustrates a system used for performing a recognition stage.

FIGS. 4A and 4B illustrate an embodiment of an overall diagram of a training stage and a recognition stage, respectively.

With reference now to FIG. 4A, FIG. 4A illustrates an embodiment of a system used for performing the training stage according to the method described in FIG. 2.

The system (401) may correspond to the computer (101) described in FIG. 1.

The system (401) may comprise a reading section (411), a data-taking section (412), a soft label-generating section (413) and an updating section (414).

The reading section (411) reads, into a memory, an NN (471), a trained AM (472), and a set of training data (473) consisting of a set of phoneme data. The trained AM (472) was in advance trained with target domain data. The set of training data (473) is domain data obtained from a domain which is different from a target domain for the target domain data.

The reading section (411) may perform step 202 described in FIG. 2.

The data-taking section (412) obtains training data among the set of the training data (473). The training data consists of phoneme data.

The data-taking section (412) may perform step 203 described in FIG. 2.

The soft label-generating section (413) inputs the obtained training data among the set of the training data (473) into the AM, calculates each posterior probability of context-dependent states corresponding to each phoneme in a phoneme class of a phoneme to which each frame in the training data belongs, and then generates a posterior probability vector from the calculated posterior probabilities, as a soft label (483) for the NN (471). Alternatively, the soft label-generating section (413) inputs the obtained training data into the AM, calculates each posterior probability of context-dependent states corresponding to each phoneme in a phoneme class of a phoneme to which each frame in the training data belongs, replaces one or more posterior probabilities which are less than a predetermined threshold with a constant value, and generates a posterior probability vector from the calculated posterior probabilities in which posterior probability vectors comprising the replaced one or more posterior probabilities are included, as a soft label (483) for the NN (471).

The soft label-generating section (413) may perform steps 204 to 206 described in FIG. 2.

The updating section (414) inputs the training data into the NN and then updates the NN, using the soft label (483).

The updating section (414) may perform steps 207 to 208 described in FIG. 2.

With reference now to FIG. 4B, FIG. 4B illustrates an embodiment of a system for performing the recognition stage, using the updated NN obtained in the training stage described in FIG. 4A.

The system (421) used in the recognition stage may be the same with or different from the system (401).

The system (421) comprises a feature extraction section (431) and a recognition section (432).

The feature extraction section (431) extracts acoustic features from the utterance data (491) which is a target to be recognized.

The recognition section (432) then performs speech recognition, using the updated NN (494) as an acoustic model. As a language model, for example, 3-gram model can be used. The 3-gram model may be generated, for example, by training data which is different from test data. The training data may be, for example, but not limited to, data derived from lecture data.

With reference now to FIG. 5, FIG. 5 illustrates results of comparative examples and a working example according to an embodiment of the present invention.

The lecture data was used as the target domain. The lecture speech data is acoustically well-matched data to test the environment. The lecture data is made up of lectures recorded at a university.

The table (501) shows conditions used in the baseline, the comparative examples 1 and 2, and the working example.

In the baseline (see "Base" in Table (501)), the acoustic model used is a trained target-domain GMM. The system trained the target-domain GMM, using the target domain data (that is, lecture data set) having the data size of 83 hours. The assumption is made that the target domain data (that is, lecture data) can be usable only in a construction of the baseline system.

In the comparative example 1 (see "Comparative 1" in Table (501)), the acoustic model used is a trained source-domain CNN. The system trained the source-domain CNN with source domain data (that is, farfield data) having the data size of 55 hours.

In the comparative example 2 (see "Comparative 2" in Table (501)), the following acoustic models were used: the trained target-domain GMM which was generated as the baseline, and the source-domain CNN which was also used in the comparative example 1. The system obtained training data among a set of farfield data used in the comparative example 1. The obtained training data has the data size of 0.71 hours (that is, 2,560 sec.). The system inputs the training data into the trained target-domain GMM, calculated each posterior probability of all of the context-dependent states, and generated a posterior probability vector from the calculated posterior probabilities, as a soft label for the source-domain CNN. The system further input the training data which was the same data input to the target-domain GMM and then updates the NN, using the soft label obtained from the trained target-domain GMM.

In the working example (see "Example" in Table (501)), the following acoustic models were used: the trained target-domain GMM which was generated as the baseline; and the source-domain CNN which was also used in the comparative example 1. The system obtained training data among a set of farfield data used in the comparative example 1. The obtained training data has the data size of 0.71 hours (that is, 2,560 sec.). The system inputs the training data into the trained target-domain GMM, calculated each posterior probability of context-dependent states corresponding to each phoneme in a phoneme class of a phoneme to which each frame in the training data belongs, replaced one or more posterior probabilities which are less than a predetermined threshold with a constant value, and generated a posterior probability vector from the calculated posterior probabilities in which posterior probability vectors comprising the replaced one or more posterior probabilities are included, as a soft label for the source-domain CNN. The system further inputs the training data which was also input to the trained target-domain GMM and then updates the NN, using the soft label which was obtained from the trained target-domain GMM.

The table (511) shows results of the comparative examples 1 and 2, and a result of the working example. The lecture data was used as input data for each acoustic model to measure performance, e.g., CER (character error rate) %.

The result of the working example is improved compared to that of the comparative example 1.

The result of the working example is improved compared to that of the comparative example 2.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for transferring acoustic knowledge of a trained acoustic model (AM) to a neural network (NN), the method comprising:
   reading, into memory, the NN and the AM, the AM being trained with target domain data, and a set of training data including a set of frames wherein each frame corresponds to one phoneme data, the set of training data being data obtained from a domain different from a target domain for the target domain data;
   inputting training data from the set of training data into the AM, calculating one or more posterior probabilities of context-dependent states corresponding to each phoneme in a phoneme class for the phoneme data associated with each frame in the training data, and generating a posterior probability vector from the one or more posterior probabilities as a soft label for the NN, each element of the soft label for the NN being limited to a posterior probability, from the one or more posterior probabilities, associated with each respective phoneme model symbol corresponding to the input phoneme data;
   replacing one or more of the one or more posterior probabilities of the soft label for the NN determined to be less than a predetermined threshold with a constant value, the constant value being smaller than the replaced posterior probabilities; and
   inputting the training data into the NN and updating the NN, using the soft label for the NN.

2. The method according to claim 1, wherein the phoneme class to which each frame in the training data belongs is retrieved from a set of phoneme classes in the memory and an attribute of each class is defined based on at least acoustic characteristics of phonemes.

3. The method according to claim 1, wherein the phonemes in the phoneme class have a same type of several distinctive features.

4. The method according to claim 1, wherein the AM is a Gaussian Mixture Model (GMM)-based AM.

5. The method according to claim 1, further comprising using the updated neural network in a speech recognition system to perform speech recognition.

6. A system comprising:
a processor; and
a memory storing a program, which, when executed on the processor, performs a method for transferring acoustic knowledge of a trained acoustic model (AM) to a neural network (NN), the method comprising:
reading, into the memory, the NN and the AM, the AM being trained with target domain data, and a set of training data including a set of frames wherein each frame corresponds to one phoneme data, the set of training data being data obtained from a domain different from a target domain for the target domain data;
inputting training data from the set of training data into the AM, calculating one or more posterior probabilities of context-dependent states corresponding to each phoneme in a phoneme class for the phoneme data associated with each frame in the training data, and generating a posterior probability vector from the one or more posterior probabilities as a soft label for the NN, each element of the soft label for the NN being limited to a posterior probability, from the one or more posterior probabilities, associated with each respective phoneme model symbol corresponding to the input phoneme data;
replacing one or more of the one or more posterior probabilities of the soft label for the NN determined to be less than a predetermined threshold with a constant value, the constant value being smaller than the replaced posterior probabilities; and
inputting the training data into the NN and updating the NN, using the soft label for the NN.

7. The system according to claim 6, wherein the phoneme class to which each frame in the training data belongs is retrieved from a set of phoneme classes in the memory and an attribute of each class is defined based on at least acoustic characteristics of phonemes.

8. The system according to claim 6, wherein the phonemes in the phoneme class have a same type of distinctive features.

9. The system according to claim 6, wherein the AM is a Gaussian Mixture Model (GMM)-based AM or a NN-based AM.

10. A non-transitory computer program product for transferring acoustic knowledge of a trained acoustic model (AM) to a neural network (NN), the computer program product comprising a computer readable storage medium having program instructions embodied therewith, wherein the computer readable storage medium is not a transitory signal per se, the program instructions executable by a computer to cause the computer to perform a method comprising:
reading, into memory, the NN and the AM, the AM being trained with target domain data, and a set of training data including a set of frames wherein each frame corresponds to one phoneme data, the set of training data being data obtained from a domain different from a target domain for the target domain data;
inputting training data from the set of training data into the AM, calculating one or more posterior probabilities of context-dependent states corresponding to each phoneme in a phoneme class for the phoneme data associated with each frame in the training data, and generating a posterior probability vector from the one or more posterior probabilities as a soft label for the NN, each element of the soft label for the NN being limited to a posterior probability, from the one or more posterior probabilities, associated with each respective phoneme model symbol corresponding to the input phoneme data;
replacing one or more of the one or more posterior probabilities of the soft label for the NN determined to be less than a predetermined threshold with a constant value, the constant value being smaller than the replaced posterior probabilities; and
inputting the training data into the NN and updating the NN, using the soft label for the NN.

11. The computer program product according to claim 10, wherein the phoneme class to which each frame in the training data belongs is retrieved from a set of phoneme classes in the memory and an attribute of each class is defined based on at least acoustic characteristics of phonemes.

12. The computer program product according to claim 10, wherein the phonemes in the phoneme class have a same type of distinctive features.

13. The computer program product according to claim 10, wherein the AM is a Gaussian Mixture Model (GMM)-based AM or a NN-based AM.

* * * * *